(12) United States Patent
Omata

(10) Patent No.: US 11,277,529 B2
(45) Date of Patent: Mar. 15, 2022

(54) IMAGE FORMING APPARATUS

(71) Applicant: CANON KABUSHIKI KAISHA, Tokyo (JP)

(72) Inventor: Haruhiko Omata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/218,045

(22) Filed: Mar. 30, 2021

(65) Prior Publication Data

US 2021/0314453 A1    Oct. 7, 2021

(30) Foreign Application Priority Data

Apr. 3, 2020    (JP) .............................. JP2020-067877

(51) Int. Cl.
    *G06F 3/12*            (2006.01)
    *H04N 1/00*          (2006.01)

(52) U.S. Cl.
    CPC ..... *H04N 1/00411* (2013.01); *H04N 1/00031* (2013.01); *H04N 1/00045* (2013.01); *H04N 1/00087* (2013.01); *H04N 1/00734* (2013.01); *H04N 1/00779* (2013.01)

(58) Field of Classification Search
    CPC ........... H04N 1/00411; H04N 1/00031; H04N 1/00045; H04N 1/00087; H04N 1/00734; H04N 1/00779
    See application file for complete search history.

(56) References Cited

U.S. PATENT DOCUMENTS

| | | | |
|---|---|---|---|
| 7,003,237 B2 | 2/2006 | Miyamoto et al. | |
| 8,843,003 B2 | 9/2014 | Nakao | |
| 10,180,641 B2 | 1/2019 | Itagaki | |
| 2008/0253814 A1* | 10/2008 | Suzuki | G03G 15/2039 399/320 |
| 2009/0196638 A1* | 8/2009 | Sukesako | G03G 15/1605 399/45 |
| 2015/0277300 A1* | 10/2015 | Hironaka | G03G 15/1675 399/66 |
| 2015/0362870 A1* | 12/2015 | Ogushi | G03G 15/23 399/66 |
| 2021/0314453 A1* | 10/2021 | Omata | H04N 1/00779 |

FOREIGN PATENT DOCUMENTS

| | | |
|---|---|---|
| JP | 2004-280003 A | 10/2004 |
| JP | 2005-132049 A | 5/2005 |
| JP | 2013-037185 A | 2/2013 |
| JP | 2017-072689 A | 4/2017 |

* cited by examiner

*Primary Examiner* — Moustapha Diaby

(74) *Attorney, Agent, or Firm* — Venable LLP

(57) ABSTRACT

An image forming apparatus includes an image forming unit, an intermediate transfer member, a transfer member, a power source, a fixing unit, a photosensor, and a control unit configured to perform a mode to output a test chart which is formed by transferring a plurality of test toner images from the intermediate transfer member onto a plurality of sheets of the recording material, the test chart being used to adjust the transfer voltage applied to the transfer member. The control unit is configured to adjust the transfer voltage based on a detection result of the photosensor detecting the plurality of test toner images fixed on the recording material. In a case where a jam occurred during execution of the mode, the control unit is configured to resume the mode after the jam has been recovered.

8 Claims, 12 Drawing Sheets

FIRST SHEET

| BLUE | | BLACK |
|---|---|---|
| ■ | -4 | ■ |
| ■ | -3 | ■ |
| ■ | -2 | ■ |
| ■ | -1 | ■ |
| ■ | 0 | ■ |

SECOND SHEET

| BLUE | | BLACK |
|---|---|---|
| ■ | 1 | ■ |
| ■ | 2 | ■ |
| ■ | 3 | ■ |
| ■ | 4 | ■ |
| ■ | 5 | ■ |

STATUS A

VISIBILITY SPECTROSCOPIC CHARACTERISTICS (VISUAL)

IMAGE FORMING APPARATUS

BACKGROUND OF THE INVENTION

Field of the Invention

The present invention relates to an image forming apparatus, such as a printer, a copier, a facsimile machine, or a multifunctional machine, using electrophotographic technology.

Description of the Related Art

Hitherto, an image forming apparatus of an intermediate transfer system which primarily transfers a toner image formed on a photosensitive drum onto an intermediate transfer belt and secondarily transfers the toner image primarily transferred onto the intermediate transfer belt onto a recording material when the recording material passes through a secondary transfer portion (nip portion) is known. In this image forming apparatus, for example, when the recording material is passing through the secondary transfer portion, the toner image is transferred from the intermediate transfer belt onto the recording material by applying a secondary transfer voltage and thus applying a desired electrical current (target electrical current) in the secondary transfer portion. However, the recording material varies in an electric resistance depending on a type (such as a paper type). Therefore, a voltage at which a voltage value predetermined depending on the type of the recording material (called a divided voltage) is added to a reference voltage capable of applying the target electrical current in the secondary transfer portion in absence of the recording material is applied as a secondary transfer voltage. To be noted, the reference voltage is determined based on a voltage/current characteristic which is acquired by sequentially applying a plurality of different test electrical currents to the secondary transfer portion (a so-called secondary transfer ATVC (Active Transfer Voltage Control)).

Incidentally, even if the type of the recording material is the same, the electrical resistance of the recording material varies depending on a moisture absorption state in the recording material, namely an amount of moisture contained in the recording material. Therefore, it occurs that, even if the secondary transfer voltage at which the divided voltage is added to the reference voltage as described above is applied, the electrical current that flows in the secondary transfer portion deviates from the target electrical current and the toner image is not transferred onto the recording material properly. Therefore, so as to adjust the secondary transfer voltage, an image forming apparatus which is capable of performing an output process (output mode) to output the recording material with a transferred patch toner image is suggested (refer to Japanese Patent Laid-Open No. 2013-37185). In a case of the image forming apparatus described in Japanese Patent Laid-Open No. 2013-37185, since, by execution of the output mode, the recording material with the transferred patch toner image is output while the voltage applied to the secondary transfer portion is being changed in stages, it is possible for a user to manually or automatically adjust the secondary transfer voltage by referring to the output recording material.

In the output mode above, there is a case where a plurality of patch toner images are dividedly transferred to a plurality of sheets of the recording material depending on a size of the recording material and a change width of the voltage which is changed in the stages. In such a case, when a so-called jam, in which the recording material is not discharged and clogs in the middle of a conveyance path, occurs, hitherto the output mode is forcibly terminated. Then, by indicating on a display device and the like, only notification of a forced termination of the output mode to the user is provided. Therefore, since it is necessary for the user to carry out over again operation to start the output mode after having removed the recording material from the conveyance path (after recovering the jam), it is troublesome and vexatious. That is, usability of the existing apparatus is not high.

SUMMARY OF THE INVENTION

In response to the above issue, this disclosure intends to provide an image forming apparatus which is capable of resuming an output mode even in a case where a jam has occurred during the output mode outputting a recording material with a plurality of toner images being transferred onto a plurality of sheets of the recording material for an adjustment of a secondary transfer voltage.

According to a first feature of the present invention, an image forming apparatus includes an image forming unit configured to form a toner image on an image bearing member, an intermediate transfer member onto which the toner image is transferred from the image bearing member, a transfer member configured to transfer the toner image from the intermediate transfer member onto a recording material, a power source configured to apply a transfer voltage to the transfer member, a fixing unit configured to fix the toner image transferred onto the recording material, a photo sensor configured to detect reflected light reflected when light is emitted to a toner fixed on the recording material, and a control unit configured to perform a mode to output a test chart which is formed by transferring a plurality of test toner images from the intermediate transfer member onto a plurality of sheets of the recording material, the test chart being used to adjust the transfer voltage applied to the transfer member, the plurality of test toner images being formed by applying different voltages to the transfer member. The control unit is configured to adjust the transfer voltage based on a detection result of the photo sensor detecting the plurality of test toner images fixed on the recording material. In a case where a jam occurred during execution of the mode, the control unit is configured to resume the mode after the jam has been recovered.

According to a second feature of the present invention, an image forming apparatus includes an image forming unit configured to form a toner image on an image bearing member, an intermediate transfer member onto which the toner image is transferred from the image bearing member, a transfer member configured to transfer the toner image from the intermediate transfer member onto a recording material, a power source configured to apply a transfer voltage to the transfer member, and a control unit configured to perform a mode to output a test chart which is formed by transferring a plurality of test toner images from the intermediate transfer member onto a plurality of sheets of the recording material, the test chart being used to adjust the transfer voltage applied to the transfer member, the plurality of test toner images being formed by applying different voltages to the transfer member. In a case where a jam occurred during execution of the mode, the control unit is configured to resume the mode after the jam has been recovered. In a case where, during execution of the mode, a first sheet of the plurality of sheets of the recording material was discharged and a second sheet of the plurality of sheets of the recording material has not been discharged since the jam occurred, and in a case where the mode is resumed after the jam has been recovered, the control unit is configured to resume the mode from the first sheet of the plurality of sheets of the recording material in a case where an elapsed time from an occurrence of the jam to a resumption of the mode is equal to or longer than a predetermined time, and configured to resume the mode from the second sheet of the plurality of sheets of the recording material in a case where the elapsed time is shorter than the predetermined time.

According to a third feature of the present invention, an image forming apparatus includes an image forming unit configured to form a toner image on an image bearing member, an intermediate transfer member onto which the toner image is transferred from the image bearing member, a transfer member configured to transfer the toner image from the intermediate transfer member onto a recording material, a power source configured to apply a transfer voltage to the transfer member, a display unit configured to display a screen, and a control unit configured to perform a mode to output a test chart which is formed by transferring a plurality of test toner images from the intermediate transfer member onto a plurality of sheets of the recording material, the test chart being used to adjust the transfer voltage applied to the transfer member, the plurality of test toner images being formed by applying different voltages to the transfer member. In a case where a jam occurred during execution of the mode, the control unit is configured to resume the mode after the jam has been recovered. In a case where, during the execution of the mode, a first sheet of the plurality of sheets of the recording material was discharged and a second sheet of the plurality of sheets of the recording material has not been discharged since the jam occurred, the control unit is configured to display a selection screen in the display unit after the jam has been recovered, the selection screen enabling a user to select to resume the mode from the first sheet of the plurality of sheets of the recording material and the second sheet of the plurality of sheets of the recording material.

According to a fourth feature of the present invention, an image forming apparatus includes an image forming unit configured to form a toner image on an image bearing member, an intermediate transfer member onto which the toner image is transferred from the image bearing member, a transfer member configured to transfer the toner image from the intermediate transfer member onto a recording material, a power source configured to apply a transfer voltage to the transfer member, a display unit configured to display a screen, and a control unit configured to perform a mode to output a test chart which is formed by transferring a plurality of test toner images from the intermediate transfer member onto a plurality of sheets of the recording material, the test chart being used to adjust the transfer voltage applied to the transfer member, the plurality of test toner images being formed by applying different voltages to the transfer member. In a case where a jam occurred during execution of the mode, the control unit is configured to resume the mode after the jam has been recovered. In a case where the jam occurred during the execution of the mode, the control unit is configured to display a selection screen in the display unit after the jam has been recovered, the selection screen enabling a user to select a resumption of the mode and a termination of the mode without resuming the mode.

Further features of the present invention will become apparent from the following description of exemplary embodiments with reference to the attached drawings.

BRIEF DESCRIPTION OF THE DRAWINGS

FIG. 3 is a diagram showing an example of an adjustment chart.

FIG. 4 is a diagram showing the other example of the adjustment chart.

DESCRIPTION OF THE EMBODIMENTS

First Embodiment

Figure 1:
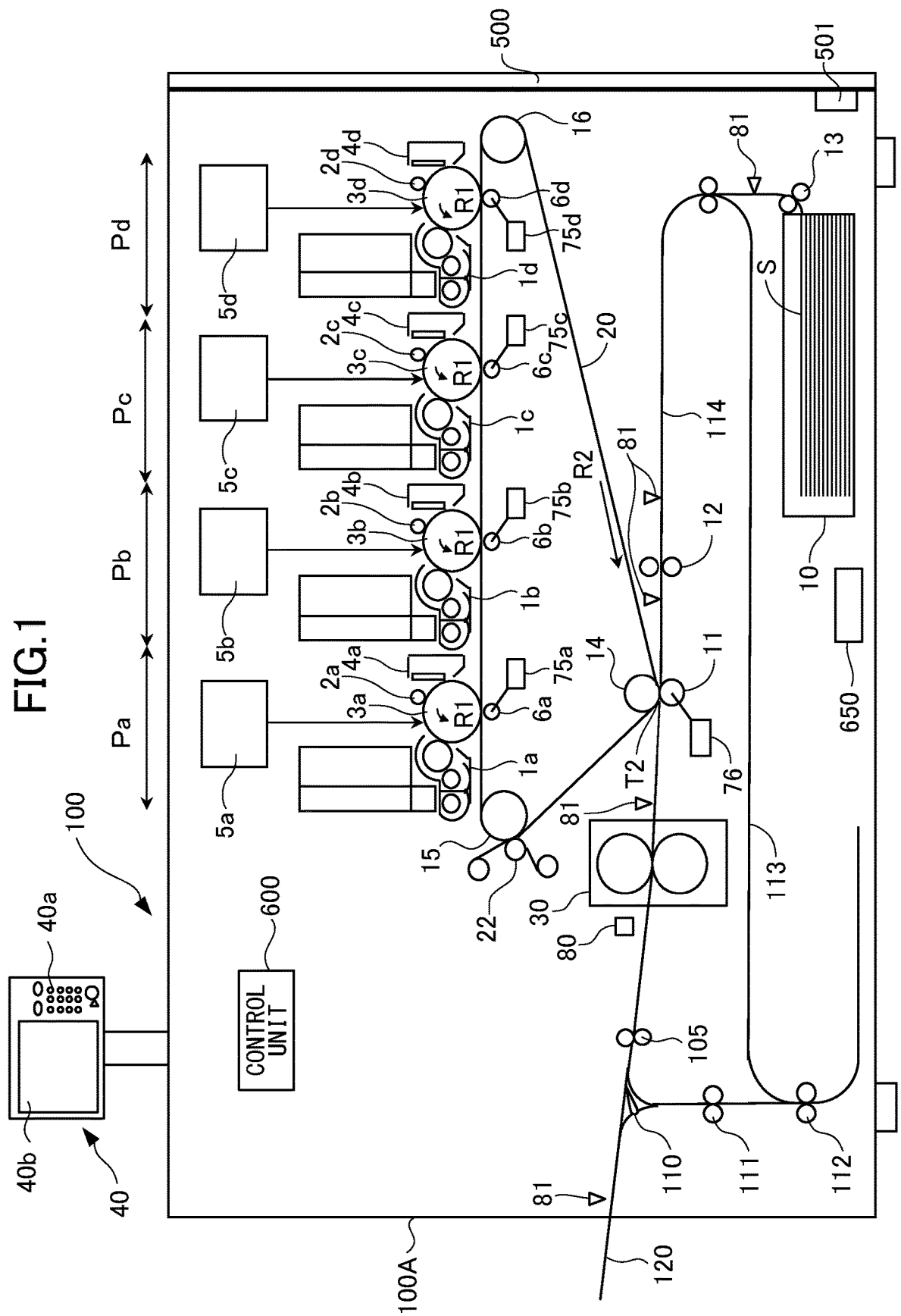
FIG. 1 is a diagram showing schematic general view of a configuration of an image forming apparatus according to a first embodiment.

Hereinafter, embodiments of this disclosure will be described with reference to attached drawings. At first, a configuration of an image forming apparatus of a first embodiment will be described using FIG. 1. The image forming apparatus 100 shown in FIG. 1 is a tandem type full color printer of an electrophotographic system. The image forming apparatus 100 includes image forming units Pa, Pb, Pc, and Pd which respectively form images of yellow, magenta, cyan, and black. The image forming apparatus 100 forms a toner image on a recording material S in accordance with image information transmitted from a document reading apparatus, not shown, coupled to an apparatus body 100A or an external apparatus, not shown, such as a personal computer, coupled to the apparatus body 100A in a form capable of communicating with each other. The recording material S includes a paper such as a standard paper, a cardboard, a rough paper, an uneven paper, and a coated paper, and various kinds of a sheet material such as a plastic film and a cloth.

A conveyance process of the recording material of the image forming apparatus 100 will be described. The recording material S is stored in a sheet feed cassette 10 in a stacked form, and sent out from the sheet feed cassette 10 by a sheet feed roller 13 at a timing synchronized with an image formation. The recording material S sent out by the sheet feed roller 13 is conveyed to a registration roller pair 12 disposed in the middle of a conveyance path 114. Then, having been corrected of a skew and a timing at the registration roller pair 12, the recording material S is sent to a secondary transfer portion T2. The secondary transfer portion T2 is a transfer nip portion formed by a secondary transfer inner roller 14 and a secondary transfer outer roller 11, and, by applying a secondary transfer voltage to the secondary transfer outer roller 11, serving as a transfer member, a toner image is transferred onto the recording material S. The secondary transfer outer roller 11 includes an elastic layer of, for example, an ion conductive foaming rubber (NBR (acrylonitrile-butadiene rubber)) coated on an outer periphery of a core metal, and is formed with an outer diameter of 20 to 25 mm. Further, an electrical resistance of the secondary transfer outer roller 11 is, for example, set at $1 \times 10^5$ to $1 \times 10^8 \Omega$ (ohms) (NN measured at 23° C., 50% RH (relative humidity), and applied voltage of 2 kV (kilovolts)).

An image forming process sending an image to the secondary transfer portion T2 in the same timing as the conveyance process of the recording material S to the secondary transfer portion T2, as described above, will be described. Although the image forming units will be described at first, the image forming units Pa, Pb, Pc, and Pd are configured almost similar to each other except for differences in colors of yellow, magenta, cyan, and black used in development units 1a, 1b, 1c, and 1d. Therefore, the image forming unit Pd of black will be described below as a representative, and descriptions of the other image forming units Pa, Pb, and Pc will be omitted herein.

The image forming unit Pd is primarily constituted by the development unit 1d, a charge unit 2d, a photosensitive drum 3d, a photosensitive drum cleaner 4d, an exposing unit 5d, and the like. A surface of the photosensitive drum 3d, serving as an image bearing member, rotated in an arrow R1 direction is uniformly charged by the charge unit 2d beforehand, and thereafter an electrostatic latent image is formed by the exposing unit 5d driven based on a signal of the image information. Next, the electrostatic latent image formed on the photosensitive drum 3d (on the image bearing member) is developed to the toner image with a developer by the development unit 1d. Then, the toner image formed on the photosensitive drum 3d is primarily transferred onto an intermediate transfer belt 20 by applying a primary transfer voltage to a primary transfer roller 6d facing the image forming unit Pd across the intermediate transfer belt 20. A primary transfer power source 75d is coupled to the primary transfer roller 6d, and applies the primary transfer voltage having a positive polarity to the primary transfer roller 6d so that the toner image charged in a negative polarity on the photosensitive drum 3d is transferred onto the intermediate transfer belt 20. Further, although illustrations are omitted, a primary transfer voltage detection sensor detecting an output voltage and a primary transfer electrical current detection sensor detecting an output electrical current are coupled to the primary transfer power source 75d. A primary transfer residual toner barely remained on the photosensitive drum 3d is collected by the photosensitive drum cleaner 4d.

The intermediate transfer belt 20, serving as an intermediate transfer member, is stretched around a secondary transfer inner roller 14, a tension roller 15, and a drive roller 16, and driven in an arrow R2 direction by the drive roller 16. The image forming process of each color processed in parallel by the image forming units Pa to Pd is performed in a timing so that the toner image is sequentially superimposed on an upstream color of the toner image primarily transferred on the intermediate transfer belt 20. As a result, a full color toner image is eventually formed on the intermediate transfer belt 20, and conveyed to the secondary transfer portion T2. To be noted, a secondary transfer residual toner remained after passed through the secondary transfer portion T2 is collected by a transfer cleaner unit 22.

Figure 2:
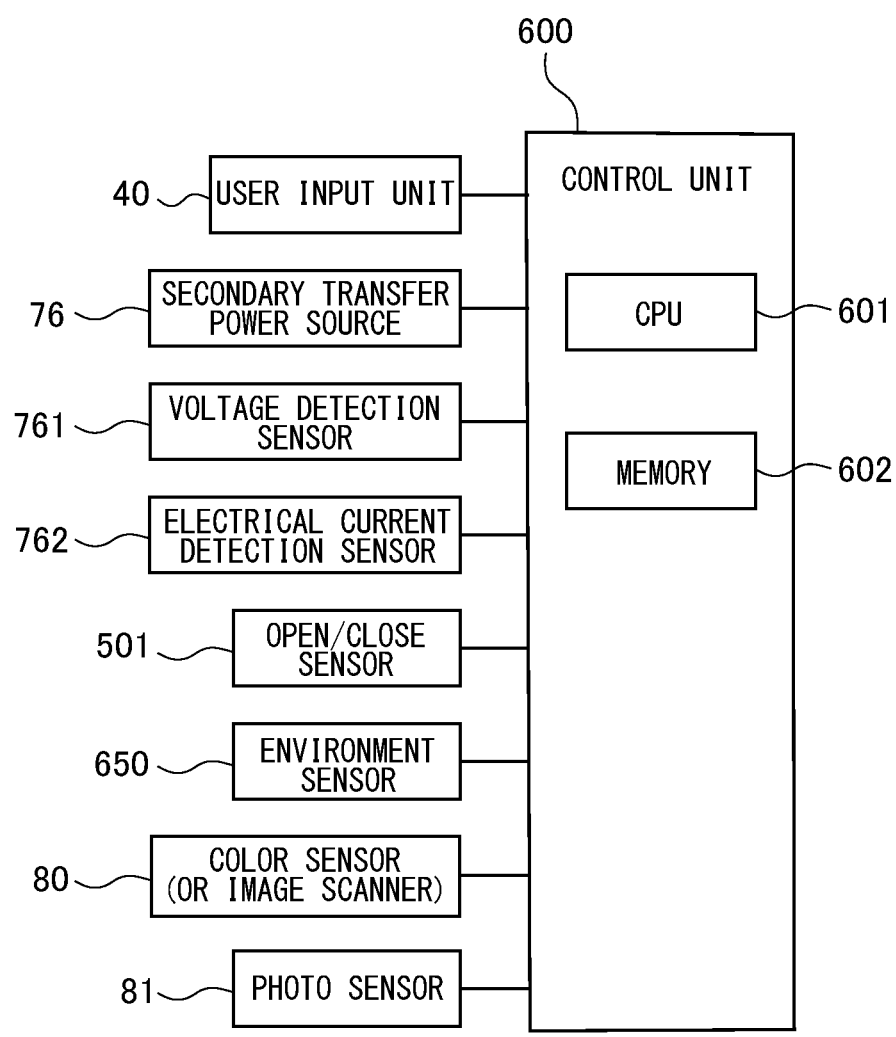
FIG. 2 is a control block diagram for an explanation of a control unit.

By the conveyance process and the image forming process as individually described above, timings of the recording material S and the full color toner image coincide with each other at the secondary transfer portion T2, and the secondary transfer is performed. The secondary transfer portion T2 is formed by pressing the secondary transfer outer roller 11 toward the secondary transfer inner roller 14 across the intermediate transfer belt 20. A secondary transfer power source 76, which is capable of varying a voltage, is coupled to the secondary transfer outer roller 11. Further, a voltage detection sensor detecting an output voltage and an electrical current detection sensor detecting an output electrical current are coupled to the secondary transfer power source 76 (refer to FIG. 2 described later).

In this embodiment, a transfer electric field is generated in the secondary transfer portion T2 since the secondary transfer inner roller 14 is coupled to a ground potential (0 V (volt)) and, on the other hand, the secondary transfer power source 76 applies the secondary transfer voltage (predetermined voltage) of the positive polarity, which is an antipolarity with respect to the toner. The secondary transfer outer roller 11 responds to the transfer electric field, and collectively transfers the toner images of four colors, namely yellow, magenta, cyan, and black, charged in the negative polarity onto the recording material S conveyed to the secondary transfer portion T2. For example, in a case where 1 to 7 kV of the secondary transfer voltage is applied by the secondary transfer power source 76, 40 to 120 µA (microamperes) of the electrical current flows in the secondary transfer portion T2, and the toner image on the intermediate transfer belt 20 (on the intermediate transfer member) is transferred onto the recording material S.

After the secondary transfer, the recording material S is conveyed to a fixing unit 30, and the toner image is fixed on the recording material S. The fixing unit 30, serving as a fixing unit, fixes the toner image on the recording material S by heating and pressing the recording material S while the recording material S, on which the toner image is formed, is being nipped and conveyed. That is, by being provided with heat and pressure, toners of the toner image formed on the recording material S are melted, mixed, and fixed on the recording material S as the full color toner image. As described above, a series of the image forming processes comes to an end.

In a case of one-side image formation, the recording material S on which the toner image is fixed by the fixing unit 30 is nipped and conveyed by a sheet discharge roller pair 105, and simply discharged onto a sheet discharge tray 120, serving as a discharge portion. On the other hand, in a case of duplex image formation, a conveyance path is switched from a path toward the sheet discharge tray 120 to a duplex conveyance path 111 by a switching member 110 (called flapper and the like), and the recording material S nipped and conveyed by the sheet discharge roller pair 105 is sent to the duplex conveyance path 111. Thereafter, after leading and tailing edges have been reversed by a reverse conveyance roller pair 112, the recording material S is sent to the conveyance path 114 again via a conveyance path (duplex path) 113. Since subsequent conveyance and image forming processes on the back surface are similar to the above, descriptions will be omitted herein.

A volume resistivity and hardness of the intermediate transfer belt 20 mentioned above are, for example, respectively set at $5 \times 10^8$ to $1 \times 10^{14}$ Ωcm (ohm centimeters) (at 23° C., 50% RH) and 60 to 85 deg in MD-1 hardness (at 23° C., 50% RH). Further, a static friction coefficient is set at 0.15 to 0.6 (measured by Friction Meter Type 94i manufactured by HEIDON Shinto Scientific Co., Ltd. at 23° C., 50% RH). Further, the intermediate transfer belt 20 includes three layers which are a base layer, an elastic layer, and a surface layer from a back surface side being abutted by the secondary transfer inner roller 14. For a material of the base layer, a resin, such as polyimide and polycarbonate, or various rubbers containing appropriate amount of carbon black, which is an antistatic additive, is used, and the base layer is formed with a thickness of 0.05 to 0.15 mm. For a material of the elastic layer, various rubbers, such as a urethane rubber and a silicone rubber, containing appropriate amount of an ionic conductive agent are used, and the elastic layer is formed with a thickness of 0.1 to 0.5 mm. For the surface layer, resin materials such as a fluoro-resin are used, and the surface layer is formed with a thickness of 0.0002 to 0.02 mm. For the surface layer, one type of the material, for example, such as polyurethane, polyester, and an epoxy resin, or equal to or more than two types of elastic materials, such as an elastic rubber, elastomer, and a butyl rubber, are used as a base material. So as to reduce surface energy and enhance lubricity, the surface layer is formed by dispersing one type or at least two types of powder or a particle of the fluoro-resin and the like with differentiating a particle size. Since an adhesion force of the toner to a surface of the intermediate transfer belt 20 including the surface layer described above becomes small, it is easy to transfer the toner onto the recording material S.

Further, inside the apparatus body 100A, a plurality of photo sensors 81 are disposed at proper positions in the conveyance paths 113 and 114 to detect whether or not the recording material S is being conveyed in the conveyance paths without causing a clog, in other words, whether or not the jam has occurred. The photo sensors 81 are each disposed, for example, downstream of the sheet feed cassette 10, upstream of the registration roller pair 12, upstream of the secondary transfer portion T2, upstream of the fixing unit 30 (downstream of the secondary transfer portion T2), and upstream of the sheet discharge tray 120 with respect to a conveyance direction of the recording material S. The photo sensor 81, for example, emits light toward the conveyance paths 113 and 114, and detects reflected light which changes in accordance with presence and absence of the recording material S. The photo sensor 81 disposed upstream of the sheet discharge tray 120 corresponds to a discharge detection unit which detects a discharge of the recording material S to the sheet discharge tray 120. Further, inside the apparatus body 100A, an environment sensor 650 detecting a temperature and humidity in the apparatus body 100A is disposed.

Further, to the apparatus body 100A, a door 500 capable of opening and closing and an open/close sensor 501, serving as an open/close detection unit, capable of detecting opening and closing of the door 500 are provided. For example, in a case where the so-called jam in which the recording material S is not discharged and clogged in the middle of the conveyance paths 113 and 114 has occurred, it is possible for a user to remove the recording material S from the conveyance paths by opening the door 500 and accessing inside the apparatus body 100A from the outside. To be noted, although only one door 500 and one open/close sensor 501 are shown in FIG. 1, it is acceptable to provide more than one door capable of opening and closing and more than one open/close sensor at positions other than the positions shown in the figure so as to enable removal of the recording material S from the conveyance paths.

Control Unit

Further, as shown in FIG. 1, the image forming apparatus 100 includes a control unit 600. The control unit 600 will be described using FIG. 2 while also referring to FIG. 1. To be noted, various apparatuses other than the apparatuses shown in the figure, such as primary transfer power sources 75a to 75d, primary transfer voltage detection sensors, primary transfer electrical current detection sensors, and various motors driving various rollers to convey the recording material S on the conveyance paths 113 and 114, are coupled to the control unit 600. However, since they are outside a main object of this disclosure, their illustrations and descriptions will be omitted from FIG. 2.

The control unit 600, serving as a control unit, controls various operations, such as an image forming operation, of the image forming apparatus 100, and includes a CPU (Central Processing Unit) 601 and a memory 602. The memory 602 is constituted by a ROM (Read Only Memory), a RAM (Random Access Memory), and the like, and stores various programs to control the image forming apparatus 100 and various data such as a reference voltage and a divided voltage, described later. The CPU 601 is capable of operating the image forming apparatus 100 to perform the image formation by executing the programs such as an image forming job and a secondary transfer voltage adjustment process, described later, stored in the memory 602. The secondary transfer voltage adjustment process (output mode) of this embodiment will be described later (refer to FIG. 5). Further, the CPU 601 is capable of functioning as a counter to count an elapsed time corresponding to opening and closing of the door 500, a number of sheets of the recording material S sent out from the sheet feed cassette 10, a number of sheets of the recording material S discharged to the sheet discharge tray 120, and the like. The number of sheets of the recording material S discharged to the sheet discharge tray 120 is stored in the memory 602 as a discharged number count. To be noted, the memory 602 is capable of temporarily storing arithmetic process results accompanied with execution of various programs and the like.

The secondary transfer power source 76 described above is coupled to the control unit 600 via an input/output interface. The control unit 600 is capable of changing the voltage (secondary transfer voltage) applied to the secondary transfer outer roller 11 by controlling the secondary transfer power source 76. The image forming apparatus 100 of this embodiment includes a voltage detection sensor 761, an electrical current detection sensor 762, and the environment sensor 650, and these sensors are coupled to the control unit 600 via the input/output interface. The voltage detection sensor 761, serving as a voltage detection unit, detects a voltage applied to the secondary transfer portion T2 accompanied with an application of the voltage to the secondary transfer outer roller 11 by the secondary transfer power source 76. The electrical current detection sensor 762, serving as an electrical current detection unit, detects the electrical current flowing in the secondary transfer portion T2 corresponding to the application of the voltage to the secondary transfer outer roller 11 by the secondary transfer power source 76. The control unit 600 is capable of acquiring the voltage detected by the voltage detection sensor 761 and the electrical current detected by the electrical current detection sensor 762. Further, the control unit 600 is capable of acquiring the temperature and humidity detected by the environment sensor 650 at suitable time.

Further, the image forming apparatus 100 includes a user input unit 40, and the user input unit 40 is coupled to the control unit 600 via the input/output interface. In a case of this embodiment, the user input unit 40 includes an operation unit 40a and a display unit 40b, and, in the operation unit 40a, various switches and buttons are provided so that the user's input of a start/stop instruction of the various programs and the various data is received. The display unit 40b is, for example, a liquid crystal display capable of displaying various screens. The display unit 40b displays a menu screen showing various executable programs, an input screen to receive data input regarding a patch toner image (refer to FIG. 6), a selection screen to select a process performed after recovering the jam (refer to FIG. 7), a change screen to change the secondary transfer voltage (refer to FIG. 8), and the like. To be noted, by displaying virtual operation items shaped like the switches provided in the operation unit 40a in the display unit 40b, it is acceptable to make it possible to receive the start instruction of the various programs, the input of the various data, and the like from the user using these virtual operation items. That is, it is acceptable that the user input unit 40 is a so-called touch panel. Alternatively, it is also acceptable that the user input unit 40 is an external apparatus, such as a personal computer, which is coupled to the apparatus body 100A in a manner capable of inputting and outputting the data.

Further, the control unit 600 receives a detection signal of the open/close sensor 501, and is capable of detecting an open/closed state of the door 500 based on the detection signal. Further, the control unit 600 receives a detection signal of the plurality of photo sensors 81, and, based on the detection signal, is capable of judging whether or not the jam has occurred by detecting the presence and absence of the recording material S in the conveyance paths 113 and 114, namely congestion of the recording material S. In a case where the jam has occurred, the control unit 600 stops the image formation and the conveyance of the recording material S, and informs the user about an occurrence of the jam using the display unit 40b and the like.

As described above, the control unit 600 applies the secondary transfer voltage to the secondary transfer outer roller 11 by controlling the secondary transfer power source 76 so as to transfer the toner image on the intermediate transfer belt 20 onto the recording material S. At this time, it is necessary for the control unit 600 to set the secondary transfer voltage so that a target electrical current capable of properly transferring the toner image flows in the secondary transfer portion T2. If the electrical current flowing in the secondary transfer portion T2 is less than the target electrical current, it is possible that transfer defects of an inadequate transfer of the toner image from the intermediate transfer belt 20 onto the recording material S occurs and causes blurring of the image. On the other hand, if the electrical current flowing in the secondary transfer portion T2 is more than the target electrical current, it is possible that an abnormal discharge occurs at the secondary transfer portion T2 and causes spattering of the toner and bleeding of the image. To avoid this, it is necessary to apply the electrical current, which does not cause the transfer defects nor the abnormal discharge, in the secondary transfer portion T2 as the target electrical current.

Secondary Transfer ATVC

Therefore, the control unit 600 performs a secondary transfer ATVC (Auto Transfer Voltage Control), and sets the secondary transfer voltage. The secondary transfer ATVC is a control which sets a voltage as the reference voltage at which it is possible to apply the target electrical current in the secondary transfer portion T2 when the recording material S is not passing through the secondary transfer portion T2. Since this reference voltage changes depending on changes in the environments (such as the temperature and humidity) and changes in the electrical resistances of the intermediate transfer belt 20 and the secondary transfer outer roller 11 due to long-term use, the control unit 600 accordingly updates the reference voltage by performing the secondary transfer ATVC. The reference voltage is stored in the memory 602. The control unit 600 performs the secondary transfer ATVC, for example, during a preliminary rotation after turning on the power source, and a sheet gap after an aggregated number of sheets of the image formed recording material S have exceeded a predetermined number of sheets (for example, 1000 sheets).

Although the secondary transfer ATVC is publicly known, an example of the secondary transfer ATVC will be described simply. The control unit 600 controls the secondary transfer power source 76 to apply voltages V1 and V2 to the secondary transfer outer roller 11 in a sequence so that electrical currents I1 and I2, which are electrical current values previously stored in the memory 602 and corresponding to the voltages V1 and V2, respectively, are applied in the secondary transfer outer roller 11 in the sequence. However, the electrical current I1 of one side has a smaller electrical current value than the target electrical current, and the electrical current I2 of the other side has a larger electrical current value than the target electrical current. Then, the control unit 600 carries out a linear approximation ($Y=(I2-I1)/(V2-V1)$) using voltage/electrical current relationships ((I1, V1) and (I2, V2)) obtained from the above, and stores this result in the memory 602, regarding the result as a voltage/electrical current characteristic (V-I characteristic) of the secondary transfer outer roller 11. Then, in accordance with the voltage/electrical current characteristic Y above, the control unit 600 calculates the reference voltage ($Vb=V1+\Delta I/Y$) from a difference $\Delta I$ between the target electrical current and the electrical current I1, which is smaller than the target electrical current, and the voltage V1, which is an applied voltage to apply the electrical current I1, and stores this reference voltage in the memory 602.

To be noted, the target electrical current is determined by the temperature and humidity detected by the environment sensor 650, a type of the recording material S (in particular, thickness, grammage, and the like) on which the image formation is performed, and the like. In particular, a setting data table, not shown, specifying the target electrical current depending on the temperature and humidity, and the type of the recording material S is stored in the memory 602 beforehand, and the control unit 600 determines the target electrical current corresponding to the temperature and humidity, and the type of the recording material S by referring to this setting data table.

As described above, the reference voltage acquired by the secondary transfer ATVC is the voltage at which it is possible to apply the target electrical current in the secondary transfer portion T2 when the recording material S is not passing through the secondary transfer portion T2 (a divided voltage Vb of the secondary transfer portion T2 at a non-sheet passing time). On the other hand, if the secondary transfer voltage applied to the secondary transfer outer roller 11 during the image forming job is not a voltage capable of applying the target electrical current in the secondary transfer portion T2 when the recording material S is passing through the secondary transfer portion T2, it is possible to cause the transfer defects and the like. Therefore, regarding the secondary transfer voltage, it is necessary to apply the voltage taking into consideration the electric resistance of the recording material S, on which the image is formed, in addition to the electric resistance of the intermediate transfer belt 20, the secondary transfer outer roller 11, and the like.

Accordingly, the control unit 600 sets the secondary transfer voltage applied to the secondary transfer outer roller 11 during the image forming job by the sum of the reference voltage Vb described above and the divided voltage Vp which takes into consideration the electric resistance of the recording material S. Since the divided voltage Vp is a voltage value at which the electric resistance of the recording material S is in a case of a standard resistance, different voltage values are specified depending on the type and the like of the recording material S, and stored in the memory 602 beforehand. For example, a larger voltage value (in the absolute value) than the divided voltage of the standard paper is specified to a divided voltage of a synthetic paper having a large electric resistance.

Adjustment of Secondary Transfer Voltage

Incidentally, in a case where the recording material S is, for example, a readily hydroscopic paper, it occurs that the electric resistance of the recording material S varies depending on a hydroscopic state, namely an amount of water contained in the recording material S, even if the type of the recording material S is the same. Therefore, even if the divided voltage taking into consideration the type of the recording material S as described above is applied, it occurs that the electrical current applied in the secondary transfer portion T2 deviates from the target electrical current and it is not possible to perform the most suitable secondary transfer from the intermediate transfer belt 20 onto the recording material S.

Figure 3:
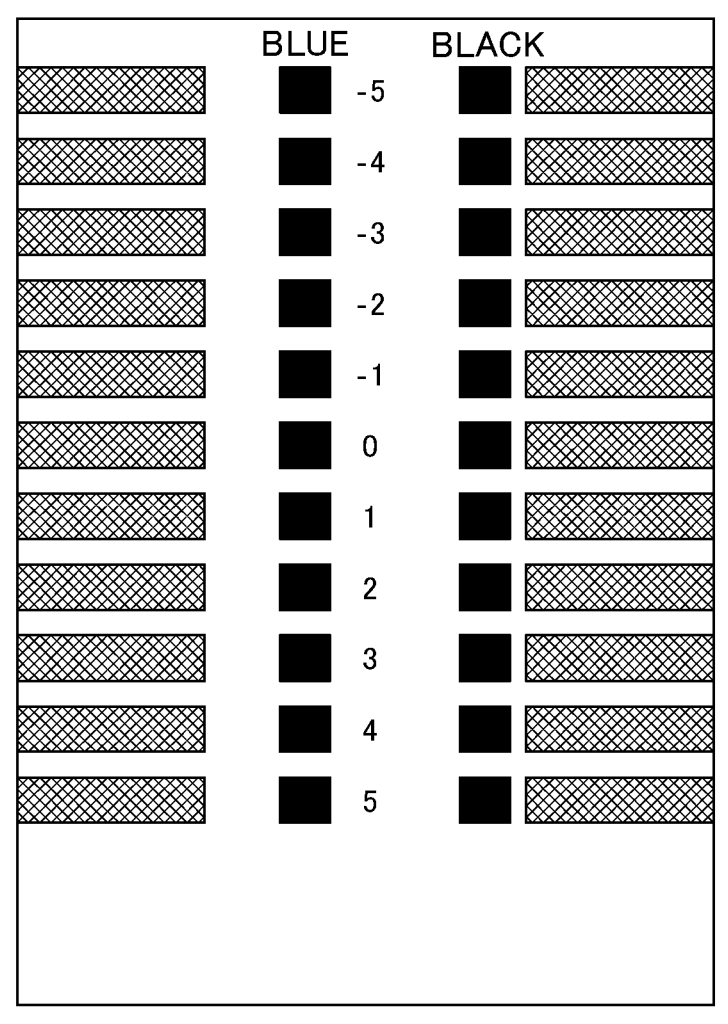

Therefore, the user is allowed to freely execute the output mode. The output mode is a process which outputs the recording material S on which the patch toner image of a representative color is formed (hereinafter referred to as an adjustment chart) while the secondary transfer voltage (in more particular, divided voltage) is being changed in stages, and makes it possible to adjust the secondary transfer voltage based on the adjustment chart. The secondary transfer voltage is adjusted between a lower limit voltage which is a voltage value capable of transferring the patch toner image of a secondary color (multiple image), such as red, green, and blue, onto the recording material S and an upper limit voltage which is a voltage value at which the image defects occur in a halftone patch image. At this point, FIGS. 3 and 4 show the adjustment chart. The adjustment chart shown in FIG. 3 shows a case where length of the recording material S in the conveyance direction is 420 to 487 mm. The adjustment chart shown in FIG. 4 shows a case where the length of the recording material S in the conveyance direction is 210 to 419 mm.

The patch image of the adjustment chart is formed in a size in which the user is able to easily judge suitability of a transcription property. In examples shown in FIGS. 3 and 4, solid and halftone images of blue and black are formed as the patch image. In a case where the patch image is the solid images of blue and black, regarding a size of the patch image, equal to larger than 10 mm square is acceptable, and equal to or larger than 25 mm square is preferable.

Once the size of the patch image formed on the adjustment chart is determined, a number of patch images formed on a sheet of the recording material S is determined. Further, if a number of secondary transfer voltages changed in the stages is high, a plurality of patch images are separately transferred onto a plurality of sheets of the adjustment chart, and, as shown in FIG. 4, it is possible to output at least two sheets of the adjustment chart by execution of the output mode. To be noted, adjacent to each patch image, for example, numerical characters of −5 to 5 (refer to FIG. 3) and the numerical characters of −4 to 0 and 1 to 5 (refer to FIG. 4) are printed in black.

However, in the image forming apparatus 100, even in a time of outputting the adjustment chart described above (in a time of the output mode), the so-called jam in which the recording material S clogs in the conveyance paths 113 and 114 is possible to occur. In a case where the jam has occurred, all of the conveyance of the recording material S being conveyed in the apparatus body is stopped. As already described, in the case where the jam has occurred, hitherto, the output mode is forcibly terminated even if the output of the adjustment chart is in progress. Accordingly, when the user has removed the recording material S from the conveyance paths 113 and 114 and recovered the jam, the output mode is not resumed. Therefore, it is troublesome since it is necessary for the user to carry out over again an operation to start the output mode from the operation unit 40a in the case where the output mode has been forcibly terminated by the jam.

Therefore, in consideration of the above, in the case where the user has removed the recording material S from the conveyance paths 113 and 114 and recovered the jam, in this embodiment, it is possible for the user to resume the output mode which was in progress when the jam occurred. Hereinafter, the secondary transfer voltage adjustment process (output mode) of this embodiment will be described using FIGS. 5 to 7 while also referring to FIGS. 1 and 2. This secondary transfer voltage adjustment process is, for example, started by the control unit 600 in response to a start instruction of the user from the operation unit 40a.

Figure 5:
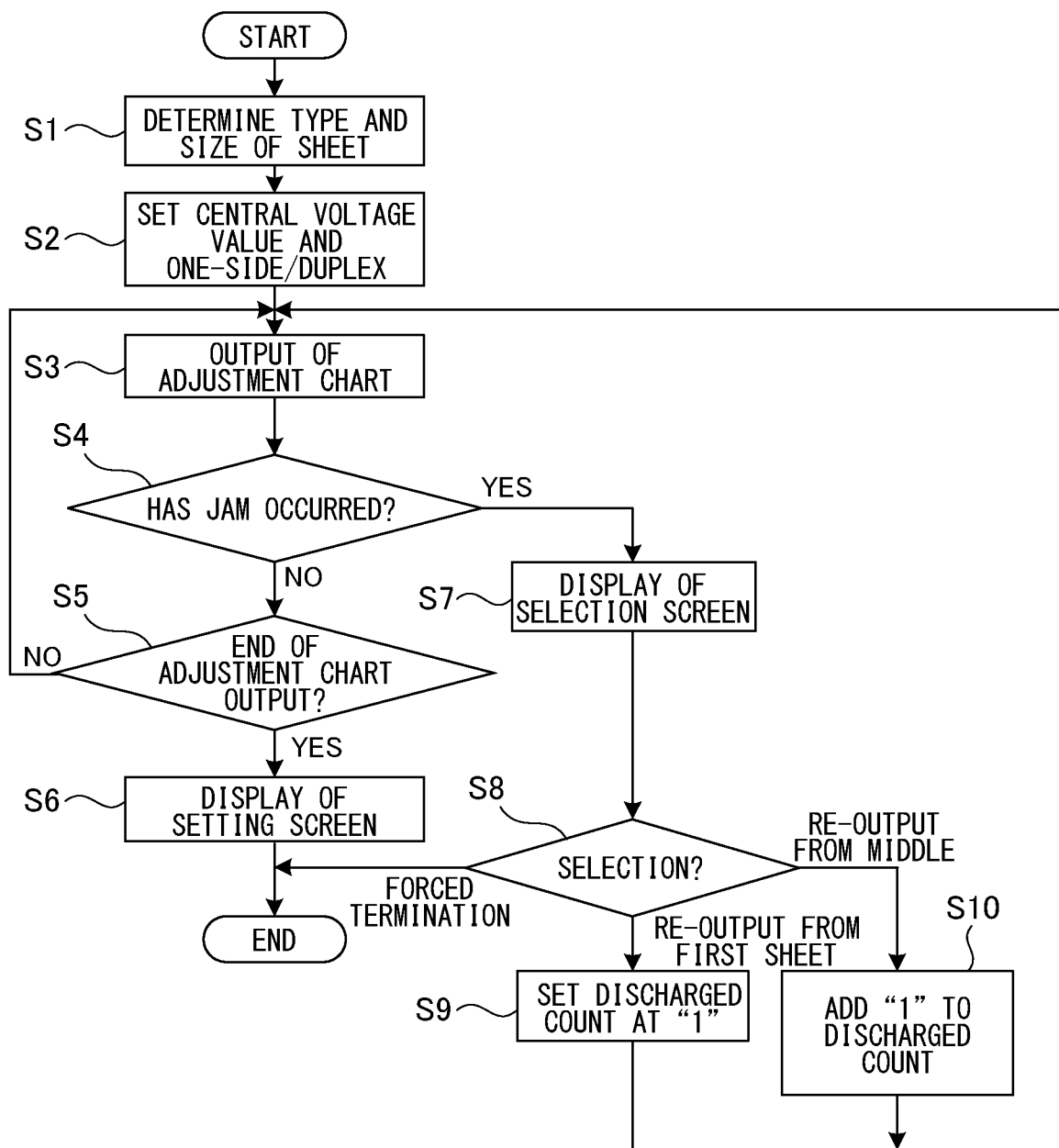
FIG. 5 is a flowchart showing a secondary transfer voltage adjustment process.

For example, in a case where the control unit 600 receives the start instruction of the output mode from the operation unit 40a, as shown in FIG. 5, in accordance with the type and the size of the recording material S input by the user from the operation unit 40a, the control unit 600 identifies the sheet feed cassette 10 storing the designated recording material S (STEP S1). Further, the control unit 600 displays an input screen shown in FIG. 6 in the display unit 40b (STEP S2).

Figure 6:
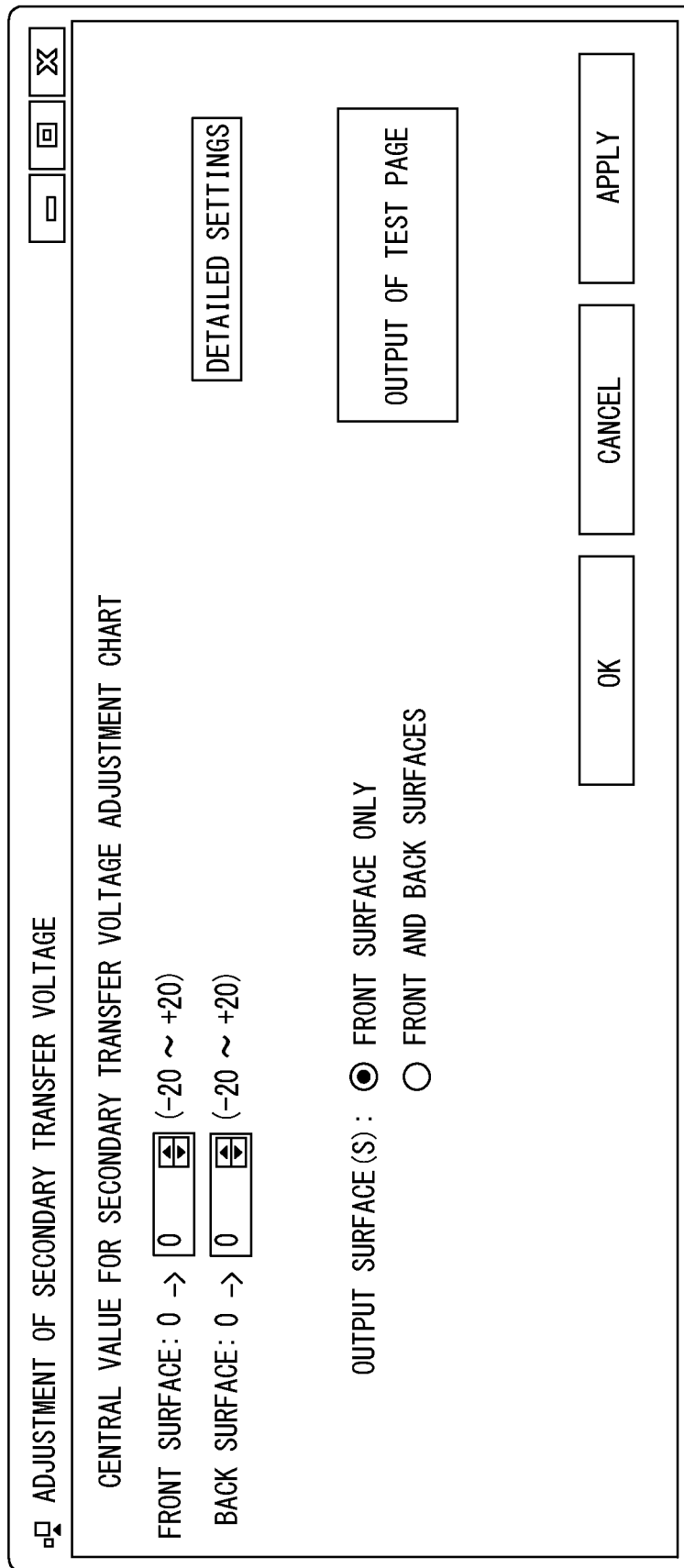
FIG. 6 is a diagram showing an input screen to input a central value of a secondary transfer voltage to form a patch toner image transferred onto the adjustment chart.

It is possible for the user to select to form the patch image either only on a front surface or on both surfaces (front and back surfaces) of the recording material S from the input screen shown in FIG. 6. Further, it is possible for the user to change a central value of the secondary transfer voltage (in FIG. 6, −20, −19 . . . 0, +1 . . . +20), which is changed in the stages to form the plurality of patch images, for each of the patch image formation surfaces (front and back surfaces) from the input screen. For example, in a case where "0" is input, if a voltage value specified to the recording material S beforehand (for an identification purpose, hereinafter referred to as an initial divided voltage) is 2500 V, the central voltage value is set at a voltage at which 2500 V is added to the reference voltage stored in the memory 602. In a case where "+1" is input, the central voltage value is set at a voltage at which the initial divided voltage and 150 V (a change width of the voltage, described later) times "+1" are added to the reference voltage. In a case where "−20" is input, the central voltage value is set at a voltage at which the initial divided voltage and 150 V times "−20" are added to the reference voltage.

In the case of this embodiment, the change width of the voltage by which the secondary transfer voltage is changed in the stages is, for example, set at 150 V. For example, in a case where the patch image is formed on an A4 size both-side coated paper, whose initial divided voltage is 2500

V, without changing the central voltage value, the secondary transfer voltage is changed from 1900 V to 3250 V in ten separate times by 150 V each time, and the patch images are formed. At this time, in a case where the patch image is formed only on the front surface, the secondary transfer voltage is changed in five separate times corresponding to "−4 to 0", and the patch images are formed on the first sheet. Then, the secondary transfer voltage is changed in five separate times corresponding to "1 to 5", and the patch images are formed on the second sheet. As described above, two sheets of the adjustment chart in total are output (refer to FIG. 4). For example, in a case where the patch image is formed only on the front surface of an A3 size recording material S, whose initial divided voltage is 2500 V, the secondary transfer voltage is changed in eleven separate times corresponding to "−5 to +5", and the patch images are formed. In this case, only one sheet of the adjustment chart is output (refer to FIG. 3).

In a case where the user selects "output test page" in the input screen, the control unit 600 substantially starts the output control of the adjustment chart. To be noted, based on various information input by the user from the operation unit 40*a* and the input screen, the control unit 600 determines a number of sheets into which the output of the adjustment chart is separated (hereinafter referred to as a number of charts).

The control unit 600 performs the output control of the adjustment chart to form the patch image on one sheet of the recording material S while changing the secondary transfer voltage in the stages (STEP S3). Then, while performing the output control of the adjustment chart, the control unit 600 judges whether or not the jam has occurred (STEP S4). Based on the detection results of the plurality of photo sensors 81 disposed on the conveyance paths, as described above, the control unit 600 judges whether or not the jam has occurred.

In a case where the jam has not occurred (STEP S4: NO), the control unit 600 judges whether or not to end the output control of the adjustment chart (STEP S5). This end judgement is made based on whether or not the number of sheets of the recording material S (adjustment chart) discharged to the sheet discharge tray 120 amount to the number of charts mentioned above. In a case where the number of sheets of the recording material S (adjustment chart) discharged to the sheet discharge tray 120 amount to the number of charts, the control unit 600 ends the output control of the adjustment chart. In a case where the control unit 600 does not end the output control of the adjustment chart (STEP S5: NO), the control unit 600 returns to the process of STEP S3 described above so as to perform the output control of the adjustment chart to form the patch image on the succeeding recording material S. In a case where the control unit 600 ends the output control of the adjustment chart (STEP S5: YES), the control unit 600 ends the secondary transfer voltage adjustment process.

The user views the output adjustment chart, and manually inputs the secondary transfer voltage (visual setting type). Alternatively, the user manually lets the document reading apparatus, not shown, read the patch image on the output adjustment chart, and adjusts the secondary transfer voltage by changing to the secondary transfer voltage acquired from the document reading apparatus (document reading apparatus setting type). For example, in a case where the user views the adjustment chart and adjusts the secondary transfer voltage, the user inputs a correction value printed adjacent to the most suitable patch image of each color (refer to FIGS. 3 and 4) from the operation unit 40*a*. Herewith, it is possible for the user to complete the adjustment of the secondary transfer voltage. The input correction value is stored in the memory 602 and referred to at the time of the secondary transfer, and the voltage value, which is acquired by adding the divided voltage corresponding to the correction value to the reference voltage, is applied as the secondary transfer voltage in the image forming job. To be noted, since a method by which the user acquires the secondary transfer voltage by letting the document reading apparatus, not shown, read the patch image on the adjustment chart is similar to a method used in a case where a color sensor 80 (or an image scanner) is provided inside the apparatus body 100A, descriptions will be omitted herein.

In the case where a color sensor 80 (or image scanner) is provided inside the apparatus body 100A (refer to FIG. 1), it is acceptable that the control unit 600 ends the secondary transfer voltage adjustment process after performing a process of STEP S6, described later (automatic setting type). Although it will be described in detail later, in the case of the automatic setting type, the control unit 600 performs an arithmetic operation of the secondary transfer voltage based on a detection result of the color sensor 80 (or image scanner). Then, it is possible for the user to change to the secondary transfer voltage acquired by the arithmetic operation from a change screen (refer to FIG. 8) (refer to STEP S6 in FIG. 5).

Returning to the description of FIG. 5, in a case where the jam has occurred when the execution of the output mode is in progress (STEP S4: YES), the control unit 600 is capable of stopping the image formation and the conveyance of the recording material S, and capable of displaying in the display unit 40*b* that the jam has occurred. In the case where the jam has occurred, the user opens the door 500 and removes the accumulated recording material S from the conveyance paths 113 and 114. Then, the user closes the door 500. Herewith, the jam is recovered. At this time, the control unit 600 is capable of measuring a time from the conveyance stop of the recording material S to the closure of the door 500.

Figure 7:
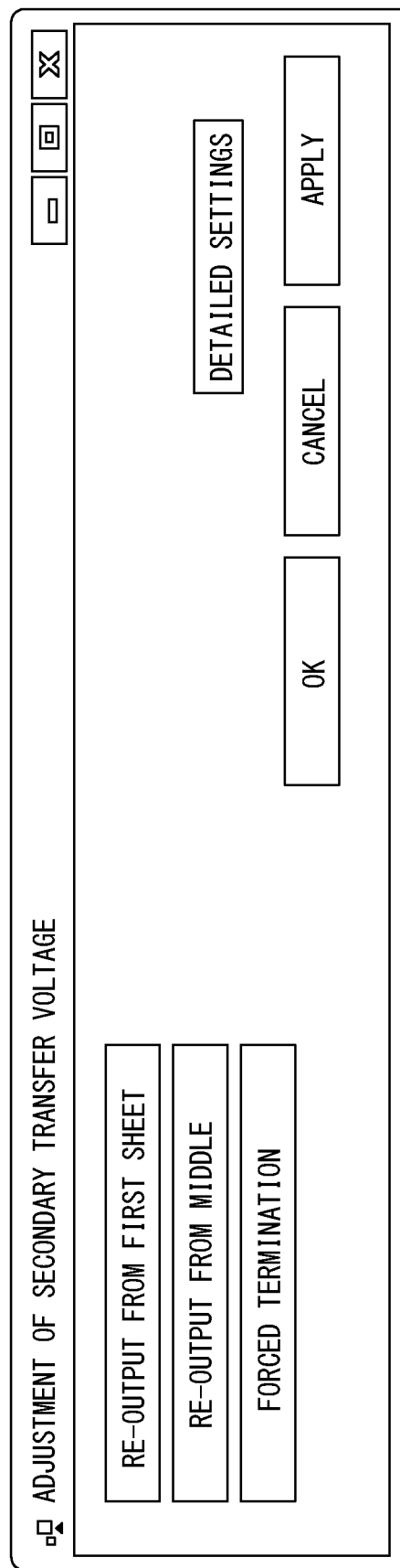
FIG. 7 is a diagram showing a selection screen to select a process after recovering the jam.

After the jam has been recovered, the control unit 600 displays a selection screen shown in FIG. 7 in the display unit 40*b* (STEP S7), and waits until the user's input comes from the selection screen. The selection screen shown in FIG. 7 is a screen to select a process of the output mode after recovering the jam. As shown in FIG. 7, it is possible for the user to select one of "re-output from the first sheet", "re-output from the middle", and "forced termination" in the selection screen. The control unit 600 performs one of controls, which are different from each other, in accordance with one of the selections mentioned above which the user has input from the selection screen (STEP S8). In a case where "forced termination" is selected, the control unit 600 ends the secondary transfer voltage adjustment process even if the output of the adjustment chart has been in progress. That is, the output mode whose execution is in the progress when the jam has occurred is not resumed. In this case, the user is not able to adjust the secondary transfer voltage using the adjustment chart.

In a case where "re-output from the first sheet" is selected, the control unit 600 sets a discharged count at "1" (STEP S9), and returns to the process of STEP S3. In this case, even if a certain number of sheets of the recording material S (adjustment chart) have been discharged to the sheet discharge tray 120, the output mode is resumed so as to output over again from the first sheet of the adjustment chart. To be noted, in this case, it is suitable that "re-output" is printed on the re-output recording material S having the same page number as the adjustment chart which was discharged before the jam has occurred. By this arrangement, for example, in a case where the user lets the document reading apparatus, not shown, read a plurality of sheets of the output adjustment chart and adjusts the secondary transfer voltage, it is possible to carry out reading of the re-output recording material S properly.

On the other hand, in a case where "re-output from the middle" is selected, the control unit 600 adds "1" to the discharged count (number of sheets of the recording material S discharged to the sheet discharge tray 120) stored in the memory 602 (STEP S10), and returns to the process of STEP S3. In this case, the output mode is resumed from the recording material S which has not been discharged outside the apparatus body. That is, the output mode is resumed so as to output from the recording material S succeeding to the recording material S which has been discharged to the sheet discharge tray 120. In a case where the output of the adjustment chart is completed without the occurrence of the jam after a resumption of the output mode (STEP S5: YES), the control unit 600 ends the secondary transfer voltage adjustment process.

As described above, in this embodiment, even in the case where the jam has occurred during the execution of the output mode, it is possible for the user to output over again from the recording material S which has not been discharged due to the jam. For example, in a case where the first sheet has been output normally and the second and succeeding sheets have not been output, the second and succeeding sheets which have not been output due to the jam are output after recovering the jam without outputting the first sheet. Further, the user is enabled to select, from the selection screen (refer to FIG. 7), this re-outputting over again from the sheet which has not been output due to the jam. Herewith, it is not necessary for the user to carry out over again the operation to start the output mode after recovering the jam, and possible to continue the output mode easily. That is, the apparatus of this embodiment has a high usability.

Further, in the case of this embodiment, since the recording material S already discharged is not re-output, wasteful consumption of the recording material S does not occur. Further, since, in the case where the second transfer voltage is adjusted by letting the document reading apparatus, not shown, read the plurality of sheets of the recording material S (adjustment chart) which have been output, the plurality of sheets of the recording material S on which the same patch image is formed are not output as described above, reading of the same recording material S does not occur.

Second Embodiment

Next, a second embodiment of this disclosure will be described. As shown in FIG. 1, there is an apparatus as the image forming apparatus 100 which is provided with the color sensor 80 (or image scanner) inside the apparatus body 100A (refer to FIG. 1). In such a case, the control unit 600 automatically sets the secondary transfer voltage in accordance with the detection result of the color sensor 80 (or image scanner) (automatic setting type). To be noted, in descriptions below, the descriptions of the configurations similar to the first embodiment will be omitted herein when using the same reference characters as the first embodiment.

In the image forming apparatus 100, the color sensor 80 is disposed downstream of the fixing unit 30 in the conveyance direction of the recording material S. In this embodiment, so as to make it possible to judge a suitability of the transcription property of a patch image of blue, in which magenta and cyan are superimposed (multiple image), in addition to the monochromatic patch image (monochromatic image), to the recording material S, the color sensor 80, which is capable of measuring a spectrum intensity of a color wavelength, acquires information on each color, described later. This acquisition of the information on each color is called a colorimetry.

Figure 9:
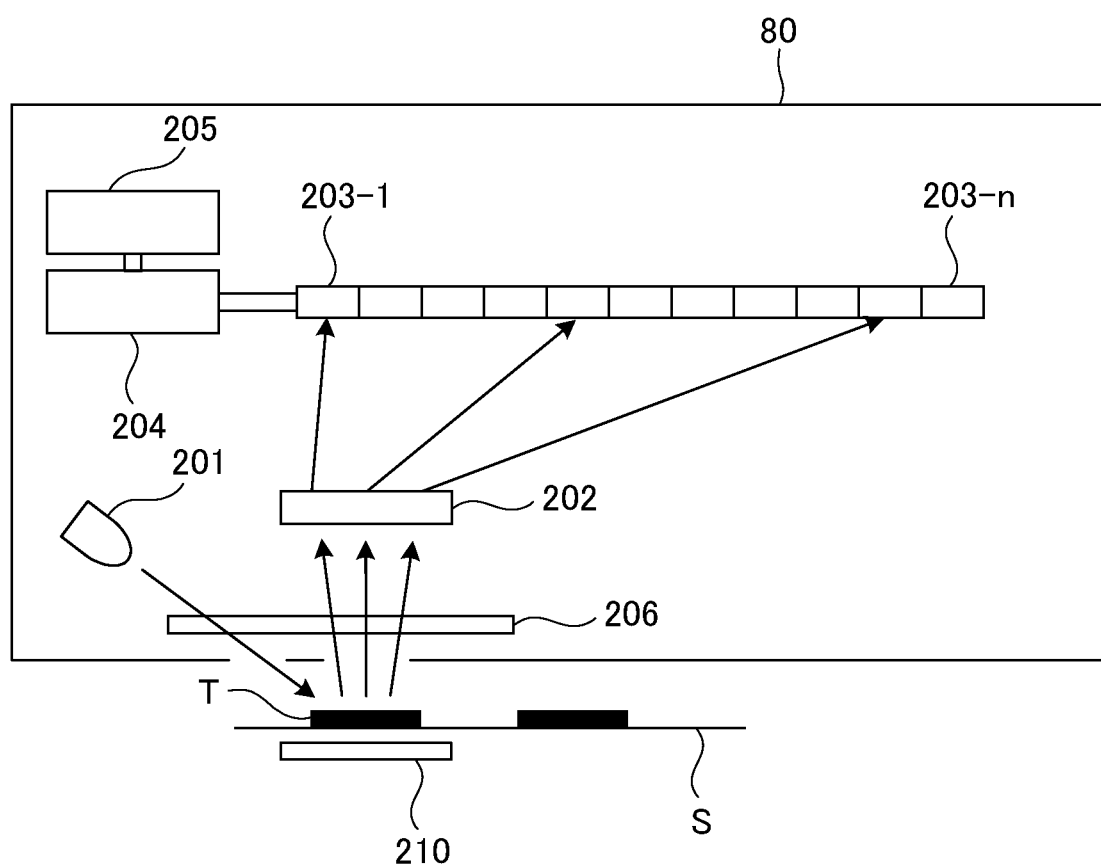
FIG. 9 is a diagram for an explanation of a color sensor.

At first, the color sensor 80, serving as a density detection unit, will be described using FIG. 9 while also referring to FIG. 1. As shown in FIG. 9, the color sensor 80 is a spectroscopic sensor, and includes a white color LED (light-emitting diode) 201, serving as an emitting portion, emitting light to the patch image T on the recording material S, and a diffraction grating 202, serving as a spectral portion, spectrally dispersing reflected light reflected from the patch image T by wavelengths. Further, the color sensor 80 includes a line sensor 203 constituted by n pixels (203-1 to 203-$n$) to detect the light spectrally dispersed by the wavelengths by the diffraction grating 202. A wavelength range which the line sensor 203, serving as a photosensing portion, is capable of detecting is substantially a whole range of a visible light region, and, for example, is set between 380 to 720 nm (nanometers). For image sensor elements (203-1 to 203-$n$) of the line sensor 203, a CMOS (complementary metal oxide semiconductor) sensor is, for example, used. To be noted, in the illustrated configuration, a lens 206 is provided to collect the reflected light from the patch image T at the diffraction grating 202.

In this embodiment, four color sensors 80 are disposed in a main scanning direction. It is possible to individually use these four color sensors 80 to detect each of the patch images (refer to FIGS. 3 and 4) formed in different positions on the adjustment chart in the main scanning direction as described above. Alternately, it is acceptable to detect one of the plurality of patch images formed on the adjustment chart by some of four color sensors 80 and use the detection results after averaging. To be noted, the main scanning direction mentioned above is a direction intersecting with the conveyance direction of the recording material S (rotational axis direction of the secondary transfer outer roller 11).

Further, the color sensor 80 includes an arithmetic operation unit 204 performing various arithmetic operations from a light intensity value of each pixel detected by the line sensor 203 and a memory 205 storing various data. The arithmetic operation unit 204, not illustrated, includes a spectral arithmetic operation portion performing an arithmetic operation of a spectrum from the light intensity value, a density arithmetic operation portion performing an arithmetic operation of an image density, a Lab arithmetic operation portion performing an arithmetic operation of a Lab value (chromaticity level), described later, and the like.

Figure 10A:
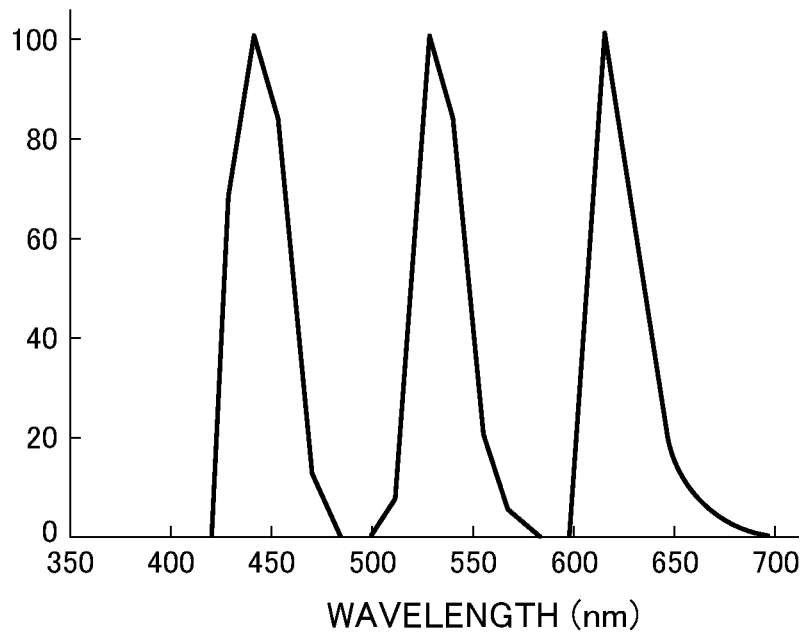
FIG. 10A is a diagram showing film characteristics of a status A filter used for a density calculation of monochromatic and multiple images of yellow, magenta, and cyan.
Figure 10B:
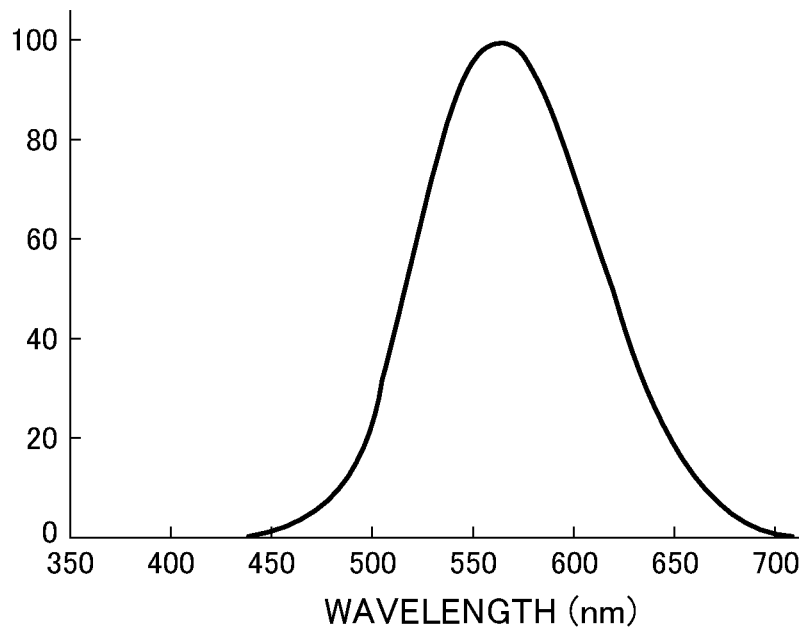
FIG. 10B is a diagram showing visual spectral characteristics of a filter used for the density calculation of a monochromatic image of black.

Next, a method to perform the arithmetic operation of the image density of the patch image from the detection result of the color sensor 80 will be described. The detection result of the color sensor 80 is sent to the arithmetic operation unit 204 as spectral reflectance data, and the arithmetic operation of the density is performed. In a case of performing the arithmetic operation of a density value based on the spectral reflectance data, a status A filter having filter characteristics shown in FIG. 10A is used for the acquired spectral reflectance data of each wavelength in the monochromatic and multiple images of yellow, magenta, and cyan. For the monochromatic image of black, a filter having visibility spectroscopic characteristics (also called Visual) shown in FIG. 10B is used.

Next, the colorimetry, namely an arithmetic operation method of a chromaticity level (L*a*b*), will be described.

In this embodiment, in the color sensor 80, the arithmetic operation unit 204 includes the Lab arithmetic operation portion, and is capable of performing the arithmetic operation of the Lab value (coordinate value of each of L*, a*, and b* in a L*a*b* color space) prescribed by CIE (Commission International de l'Éclairage). The arithmetic operation method (ISO (International Organization for Standardization) 13655) of the chromaticity level (L*a*b*) based on the spectral reflectance read by the color sensor 80 is shown below.

a. Acquire a spectral reflectance $R(\lambda)$ of a sample ($\lambda$: 380 to 780 nm).

b. Acquire color matching functions $x(\lambda)$, $y(\lambda)$, and $z(\lambda)$, and a standard illuminants spectral distribution $SD50(\lambda)$. To be noted, the color matching functions are prescribed in JIS (Japanese Industrial Standard) Z8701. On the other hand, $SD50(\lambda)$ is prescribed in JIS Z8720, and also called supplementary standard illuminants D50.

c. Multiply the spectral reflectance $R(\lambda)$, the color matching functions $x(\lambda)$, $y(\lambda)$, and $z(\lambda)$, and the standard illuminants spectral distribution $SD50(\lambda)$ together at each wavelength.

$$R(\lambda) \times SD50(\lambda) \times x(\lambda)$$

$$R(\lambda) \times SD50(\lambda) \times y(\lambda)$$

$$R(\lambda) \times SD50(\lambda) \times z(\lambda)$$

d. Add up the products of (c) over a whole wavelength region.

$$\Sigma\{R(\lambda) \times SD50(\lambda) \times x(\lambda)\}$$

$$\Sigma\{R(\lambda) \times SD50(\lambda) \times y(\lambda)\}$$

$$\Sigma\{R(\lambda) \times SD50(\lambda) \times z(\lambda)\}$$

e. Calculate an integrated value of the product of the color-matching function $y(\lambda)$ and the standard illuminants spectral distribution $SD50(\lambda)$.

$$\Sigma\{SD50(\lambda) \times y(\lambda)\}$$

f. Calculate a coordinate value in an XYZ color space.

$$X = 100 \times \Sigma\{SD50(\lambda) \times y(\lambda)\} / \Sigma\{R(\lambda) \times SD50(\lambda) \times x(\lambda)\}$$

$$Y = 100 \times \Sigma\{SD50(\lambda) \times y(\lambda)\} / \Sigma\{R(\lambda) \times SD50(\lambda) \times y(\lambda)\}$$

$$Z = 100 \times \Sigma\{SD50(\lambda) \times y(\lambda)\} / \Sigma\{R(\lambda) \times SD50(\lambda) \times z(\lambda)\}$$

g. Convert the XYZ coordinate values obtained at (f) into the L*a*b* color space.

$$L^* = 116 \times (Y/Yn)^{(1/3)} - 16$$

$$a^* = 500 \times \{(X/Xn)^{(1/3)} - (Y/Yn)^{(1/3)}\}$$

$$b^* = 200 \times \{(Y/Yn)^{(1/3)} - (Z/Zn)^{(1/3)}\}$$

At (g) above, Xn, Yn, and Zn are the coordinate values (standard illuminants tristimulus values) of a white color point serving as a reference. Further, the above are the conversion equations in a case where X/Xn, Y/Yn, and Z/Zn are equal to or larger than 0.008856, and, in a case where X/Xn, Y/Yn, and Z/Zn are less than 0.008856, X/Xn, Y/Yn, and Z/Zn portions at the conversion equations (g) are changed as shown below.

If X/Xn is less than 0.008856, replace "$(X/Xn)^{(1/3)}$" with "$7.78 \times (X/Xn)^{(1/3)} + 16/116$".

If Y/Yn is less than 0.008856, replace "$(Y/Yn)^{(1/3)}$" with "$7.78 \times (Y/Yn)^{(1/3)} + 16/116$".

If Z/Zn is less than 0.008856, replace "$(Z/Zn)^{(1/3)}$" with "$7.78 \times (Z/Zn)^{(1/3)} + 16/116$".

By performing the arithmetic operations as described above, it is possible to calculate the chromaticity level (L*a*b*). To be noted, "L*a*b*" is also written as "Lab" by omitting "*"s.

Further, so as to determine a condition of the secondary transfer voltage, a color difference from the recording material S is used depending on a color. The color difference is a distance between two points in the Lab three dimensional space, and it is possible to calculate by an equation 1 below.

Color difference between the recording material $S$ and the patch image=((recording material $(L)$-patch image $(L))^2$+(recording material $(a)$-patch image $(a))^2$+(recording material $(b)$-patch image $(b))^2)^{0.5}$    Equation 1

To be noted, so as to calibrate the color sensor 80, an adjustment of a white color LED light amount and a correction of a reference spectral reflectance are carried out using a white color reference plate. Since it is possible to use a publicly known process for this calibration process, descriptions are omitted herein.

Using the image forming apparatus 100 including the color sensor 80 described above, the output mode described above (refer to FIG. 5) is performed. In this case, each patch image of black, gray, and blue is formed on the recording material S. Then, having passed through the fixing unit 30, the patch image formed on the recording material S is read by the color sensor 80. The control unit 600 (refer to FIG. 2) acquires, from the color sensor 80, the image density regarding the patch images of gray and black, and the chromaticity level (L*a*b*) regarding the patch image of blue, and stores the information in the memory 602. To be noted, in a case where the control unit 600 performs "re-output from the middle" after recovering the jam, the control unit 600 keeps, not resetting, the information regarding the already output adjustment chart. In a case where the control unit 600 performs "re-output from the first sheet" after recovering the jam, the control unit 600 resets the information regarding the already output adjustment chart.

Figure 8:
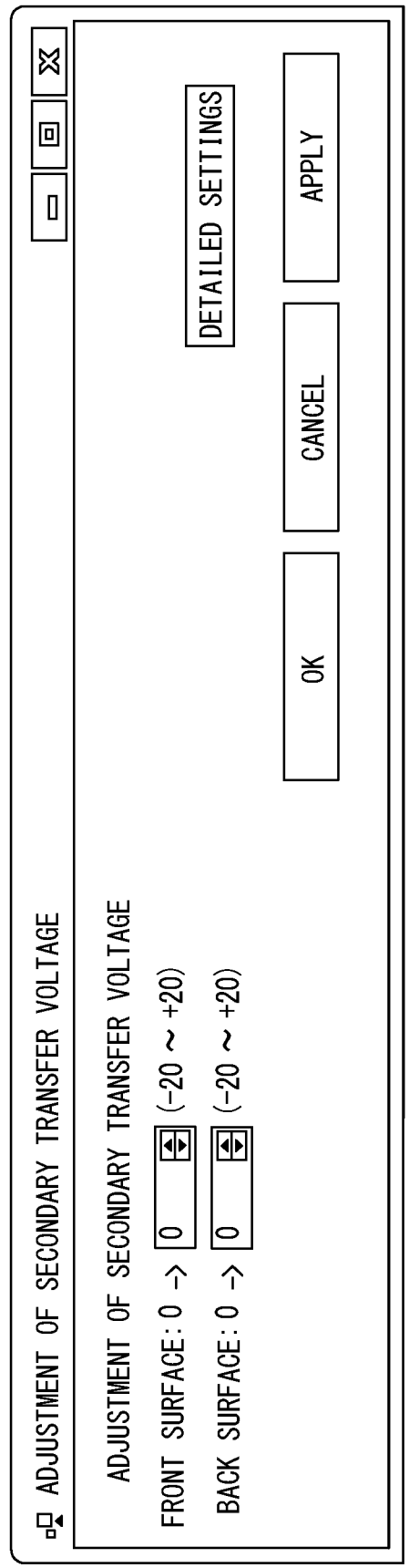
FIG. 8 is a diagram showing a change screen to change a secondary transfer voltage.

In this embodiment, as shown in FIG. 5, when the control unit 600 has completed the output control of the adjustment chart (STEP S5: YES), the control unit 600 displays a setting screen shown in FIG. 8 in the display unit 40b (STEP S6). At this time, the control unit 600 is capable of setting the secondary transfer voltage at the voltage value of the patch image specified for the image density and chromaticity level (L*a*b*) stored in the memory 602. Further, in a case where the setting screen is displayed, the user is able to adjust the secondary transfer voltage using the setting screen. For example, an adjustment width of the secondary transfer voltage in the setting screen shown in FIG. 8 is 150 V (hereinafter referred to as one level). In this embodiment, a voltage adjustment range is set at a maximum of plus/minus 20 levels, namely plus/minus 3000 V. As an example, in a case where the user sets the level at "+3", the secondary transfer voltage applied in the image forming job is set at a voltage value at which 450 V (150 V×"+3") is added to the secondary transfer voltage stored in the memory 602. To be noted, this adjustment width of the secondary transfer voltage is set at the same value as the change width by which the secondary transfer voltage is changed in the stages to form the patch image on the adjustment chart.

As described above, also in this embodiment, since the user is able to re-output over again easily from the recording material S which has not been output due to the jam, the usability is high. Further, in this embodiment, since it is possible to adjust the secondary transfer voltage by using the colorimetry measurement result of the normally output recording material S, whose colorimetry has been already measured, and the re-output recording material S, it is possible to shorten a time required for processing of the output mode.

Alternative Embodiments

To be noted, as the image forming apparatus 100, there is an apparatus in which the image scanner, instead of the color sensor 80, is provided downstream of the recovering unit 30 in the conveyance direction of the recording material S. In such a case, the control unit 600 automatically sets the secondary transfer voltage based on a detection result of the image scanner when the output mode is executed. For the image scanner, for example, CIS (contact image sensor) type and CCD (charge-coupled device) type image scanners are used, and the image scanner is capable of detecting an optical intensity of the patch image formed on the adjustment chart, for example, through a filter corresponding to red, green, and blue. Further, similar to the color sensor 80 as described above, the image scanner is capable of performing the arithmetic operation of the image density and the chromaticity level (L*a*b*) of the patch image based on the detected optical intensity. Further, the control unit 600 (refer to FIG. 2) acquires, from the image sensor, the image density regarding the patch images of gray and black, and the chromaticity level (L*a*b*) regarding the patch image of blue. Since the subsequent processes are also similar to the color sensor 80 described above, descriptions will be omitted herein.

To be noted, although, in any of the embodiments described above, in the case where the jam has occurred during the execution of the output mode, the selection screen (refer to FIG. 7) is displayed and the user is able to select any one of "re-output from the first sheet" and "re-output from the middle" other than "forced termination", it is not limited to this. For example, it is acceptable that the user is enabled to select only either one of "re-output from the first sheet" and "re-output from the middle" depending on how much time is elapsed before the jam has been recovered after the jam occurred. In particular, in the case where the jam has occurred during the execution of the output mode, if a time elapsed from the conveyance stop of the recording material S to the closure of the door 500 is equal to or longer than a predetermined time (for example, 3 to 5 minutes), "re-output from the first sheet" is displayed on the selection screen, and "re-output from the middle" is not displayed. On the contrary, if the time elapsed from the conveyance stop of the recording material S to the closure of the door 500 is shorter than the predetermined time, "re-output from the middle" is displayed on the selection screen, and "re-output from the first sheet" is not displayed.

At this point, in the case where the jam has occurred, the user opens the door 500, and removes the recording material S from the conveyance paths 113 and 114, and thereafter closes the door 500. In this embodiment, the elapsed time from the conveyance stop of the recording material S to the closure of the door 500 is deemed to be corresponding to a time from the occurrence of the jam to recovering the jam, and, by changing contents displayed in the selection screen based on this presumption, the process which the user is able to select is limited. To be noted, it is not limited to not displaying either one of "re-output from the first sheet" and "re-output from the middle", and, for example, it is acceptable that a display mode is changed from a selectable time (for example, changing a display color into such as gray) and the user's selection from the user input unit 40 is made unavailable.

This is because of reasons described below. For example, in a case where the jam has occurred at the second sheet of the adjustment chart after having discharged the first sheet, there is a risk to derive the transfer defects when the second sheet is discharged after recovering the jam and the secondary transfer voltage applied in the image forming job is adjusted by using the first and second sheets of the adjustment chart. The cause is that, if it has taken a time (for example, equal to or longer than 3 to 5 minutes) to recover the jam after the jam of the second sheet occurred, the environment inside the image forming apparatus 100 at the output of the first sheet of the adjustment chart is different from the environment after recovering the jam. In particular, it occurs that the humidity (which affects the amount of water contained in the recording material S) inside the apparatus body 100A varies between before and after the jam. If the humidity inside the apparatus body 100A varies between before and after the jam, the transcription property of the patch image is affected even if the same secondary transfer voltage is applied to the first and second sheets at the formation of the patch image. Therefore, it is preferable that, in the case where it has taken the time to recover the jam, it is possible to adjust the secondary transfer voltage by selecting "re-output from the first sheet" and using the plurality of sheets of the adjustment chart whose patch images are formed under the same environmental conditions in the apparatus body 100A.

Figure 11:
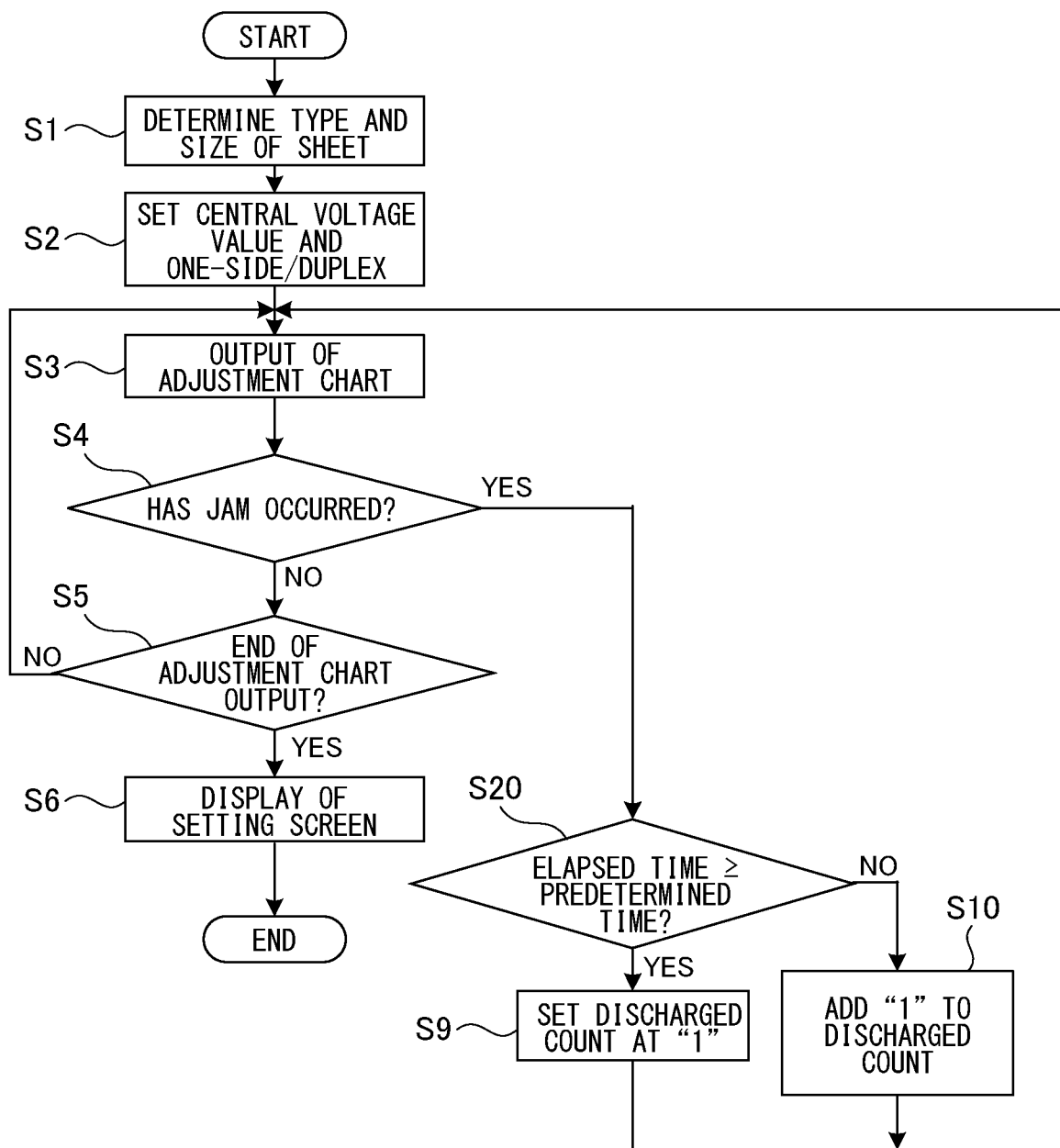
FIG. 11 is a flowchart showing a secondary transfer voltage adjustment process according to a second embodiment.

Further, in the case where the elapsed time from the conveyance stop of the recording material S to the closure of the door 500 is equal to or longer than the predetermined time, it is acceptable to automatically "re-output from the first sheet" after recovering the jam without letting the user select from the selection screen described above. In such a case, in the case where the elapsed time from the conveyance stop of the recording material S to the closure of the door 500 is shorter than the predetermined time, it is acceptable to automatically "re-output from the middle" after recovering the jam. FIG. 11 shows a flowchart of the secondary transfer voltage adjustment process in which the process is configured as described above. Since STEPS S1 to S6 of the secondary transfer voltage adjustment process shown in FIG. 11 are the same as STEPS S1 to S6 of the secondary transfer voltage adjustment process in FIG. 5, descriptions of STEPS S1 to S6 will be omitted herein.

As shown in FIG. 11, in the case where the jam occurred during the execution of the output mode (STEP S4: YES), after the jam has been recovered by the user, the control unit 600 judges whether or not the elapsed time from the conveyance stop of the recording material S to the closure of the door 500 is equal to or longer than the predetermined time (STEP S20). In the case where the elapsed time from the conveyance stop of the recording material S to the closure of the door 500 is equal to or longer than the predetermined time (STEP S20: YES), the control unit 600 sets the discharged count at "1" (STEP S9), and returns to the process of STEP S3. In this case, even if a certain number of sheets of the recording material S (adjustment chart) have been discharged to the sheet discharge tray 120, the output mode is resumed so that the output of the adjustment chart is started over again from the first sheet.

On the other hand, in the case where the elapsed time from the conveyance stop of the recording material S to the closure of the door 500 is shorter than the predetermined time (STEP S20: NO), the control unit 600 adds "1" to the discharged count (number of sheets of the recording material S discharged to the sheet discharge tray 120) (STEP S10), and returns to the process of STEP S3. In this case, the output mode is resumed from the recording material S which has not been discharged outside the apparatus body. That is, the output mode is resumed from the recording material S succeeding to the recording material S which has been discharged to the sheet discharge tray 120. Herewith, it is not necessary for the user to carry out over again the operation to start the output mode after recovering the jam.

Figure 12:
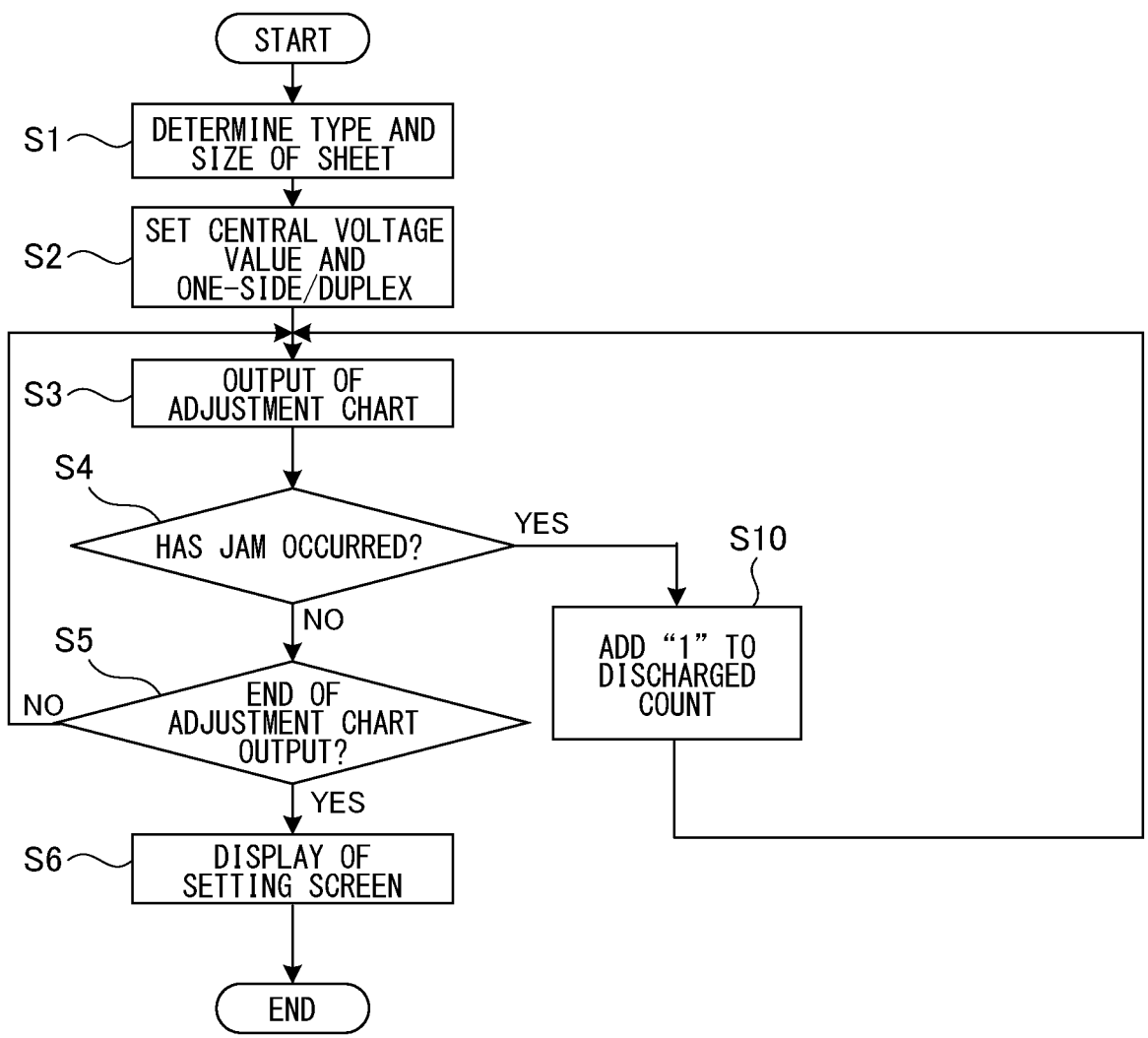
FIG. 12 is a flowchart showing a secondary transfer voltage adjustment process of an alternative embodiment.

Alternatively, it is acceptable to automatically "re-output from the first sheet" without letting the user select from the selection screen described above and regardless of a length of the elapsed time from the conveyance stop of the recording material S to the closure of the door 500. FIG. 12 shows a flowchart of the secondary transfer voltage adjustment process in a case where the process described above is performed. Since STEPS S1 to S6 of the secondary transfer voltage adjustment process shown in FIG. 12 are the same as STEPS S1 to S6 of the secondary transfer voltage adjustment process shown in FIG. 5, descriptions of STEPS S1 to S6 will be omitted herein.

As shown in FIG. 12, in the case where the jam occurred during the execution of the output mode (STEP S4: YES), after the jam has been recovered by the user, the control unit 600 adds "1" to the discharged count (number of sheets of the recording material S discharged to the sheet discharge tray 120) (STEP S10), and returns to the process of STEP S3. As described above, in the case where the jam has occurred, the output mode is resumed so that the output of the adjustment chart is started from the sheet which has not been discharged outside the apparatus body. Herewith, it is not necessary for the user to carry out over again the operation to start the output mode after recovering the jam.

By this disclosure, in the case where the conveyance of the recording material S has been stopped during the execution of the output mode, which is for the adjustment of the secondary transfer voltage, it is possible for the user to easily continue to carry out the output mode, which has been in the progress at the time of the conveyance stop, after having removed the recording material S from the conveyance paths. Further, it is possible to reduce the wasteful consumption of the sheet.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-67877, filed Apr. 3, 2020, which is hereby incorporated by reference herein in its entirety.

What is claimed is:

1. An image forming apparatus comprising:
    an image forming unit configured to form a toner image on an image bearing member;
    an intermediate transfer member onto which the toner image is transferred from the image bearing member;
    a transfer member configured to transfer the toner image from the intermediate transfer member onto a recording material;
    a power source configured to apply a transfer voltage to the transfer member;
    a fixing unit configured to fix the toner image transferred onto the recording material;
    a photosensor configured to detect reflected light reflected when light is emitted to toner fixed on the recording material; and
    a control unit configured to perform a mode to output a test chart which is formed by transferring a plurality of test toner images from the intermediate transfer member onto a plurality of sheets of the recording material, the test chart being used to adjust the transfer voltage applied to the transfer member, the plurality of test toner images being formed by applying different voltages to the transfer member,
    wherein the control unit is configured to adjust the transfer voltage based on a detection result of the photosensor detecting the plurality of test toner images fixed on the recording material, and
    wherein, in a case where a jam occurred during execution of the mode, the control unit is configured to resume the mode after the jam has been recovered.

2. The image forming apparatus according to claim 1, wherein, in a case where, during the execution of the mode, a first sheet of the plurality of sheets of the recording material was discharged and a second sheet of the plurality of sheets of the recording material has not been discharged since the jam occurred, and in a case where the mode is resumed after the jam has been recovered, the control unit is configured to output the second sheet of the plurality of sheets of the recording material without outputting the first sheet of the plurality of sheets of the recording material.

3. The image forming apparatus according to claim 1, further comprising:
    a display unit configured to display a screen,
    wherein, in a case where the jam occurred during the execution of the mode, the control unit is configured to display a selection screen on the display unit after the jam has been recovered, the selection screen enabling a user to select from among a resumption of the mode and a termination of the mode without resuming the mode.

4. The image forming apparatus according to claim 1, wherein the photosensor comprises an emitting portion to emit the light to the recording material, a photosensing portion to receive the reflected light, and a spectral portion to spectrally disperse the reflected light by wavelengths.

5. An image forming apparatus, comprising:

an image forming unit configured to form a toner image on an image bearing member;

an intermediate transfer member onto which the toner image is transferred from the image bearing member;

a transfer member configured to transfer the toner image from the intermediate transfer member onto a recording material;

a power source configured to apply a transfer voltage to the transfer member; and a control unit configured to perform a mode to output a test chart which is formed by transferring a plurality of test toner images from the intermediate transfer member onto a plurality of sheets of the recording material, the test chart being used to adjust the transfer voltage applied to the transfer member, the plurality of test toner images being formed by applying different voltages to the transfer member, wherein, in a case where a jam occurred during execution of the mode, the control unit is configured to resume the mode after the jam has been recovered, and wherein, in a case where, during execution of the mode, a first sheet of the plurality of sheets of the recording material was discharged and a second sheet of the plurality of sheets of the recording material has not been discharged since the jam occurred, and in a case where the mode is resumed after the jam has been recovered, the control unit is configured to resume the mode from the first sheet of the plurality of sheets of the recording material in a case where an elapsed time from an occurrence of the jam to a resumption of the mode is equal to or longer than a predetermined time, and configured to resume the mode from the second sheet of the plurality of sheets of the recording material in a case where the elapsed time is shorter than the predetermined time.

6. An image forming apparatus, comprising:

an image forming unit configured to form a toner image on an image bearing member;

an intermediate transfer member onto which the toner image is transferred from the image bearing member;

a transfer member configured to transfer the toner image from the intermediate transfer member onto a recording material;

a power source configured to apply a transfer voltage to the transfer member;

a display unit configured to display a screen; and a control unit configured to perform a mode to output a test chart which is formed by transferring a plurality of test toner images from the intermediate transfer member onto a plurality of sheets of the recording material, the test chart being used to adjust the transfer voltage applied to the transfer member, the plurality of test toner images being formed by applying different voltages to the transfer member, wherein, in a case where a jam occurred during execution of the mode, the control unit is configured to resume the mode after the jam has been recovered, and wherein, in a case where, during the execution of the mode, a first sheet of the plurality of sheets of the recording material was discharged and a second sheet of the plurality of sheets of the recording material has not been discharged since the jam occurred, the control unit is configured to display a selection screen on the display unit after the jam has been recovered, the selection screen enabling a user to select to resume the mode from one of the first sheet of the plurality of sheets of the recording material and the second sheet of the plurality of sheets of the recording material.

7. The image forming apparatus according to claim 6, wherein the control unit is configured to display, after the jam has been recovered, the selection screen which enables the user to select to terminate the mode without resuming the mode.

8. An image forming apparatus, comprising:

an image forming unit configured to form a toner image on an image bearing member;

an intermediate transfer member onto which the toner image is transferred from the image bearing member;

a transfer member configured to transfer the toner image from the intermediate transfer member onto a recording material;

a power source configured to apply a transfer voltage to the transfer member;

a display unit configured to display a screen; and a control unit configured to perform a mode to output a test chart which is formed by transferring a plurality of test toner images from the intermediate transfer member onto a plurality of sheets of the recording material, the test chart being used to adjust the transfer voltage applied to the transfer member, the plurality of test toner images being formed by applying different voltages to the transfer member, wherein, in a case where a jam occurred during execution of the mode, the control unit is configured to resume the mode after the jam has been recovered, and wherein, in a case where the jam occurred during the execution of the mode, the control unit is configured to display a selection screen on the display unit after the jam has been recovered, the selection screen enabling a user to select from among a resumption of the mode and a termination of the mode without resuming the mode.

* * * * *